US011986944B1

(12) United States Patent
Kao

(10) Patent No.: US 11,986,944 B1
(45) Date of Patent: May 21, 2024

(54) SOCKET HOLDING FRAME ASSEMBLY

(71) Applicant: Jui Chien Kao, Taichung (TW)

(72) Inventor: Jui Chien Kao, Taichung (TW)

( * ) Notice: Subject to any disclaimer, the term of this patent is extended or adjusted under 35 U.S.C. 154(b) by 77 days.

(21) Appl. No.: 17/984,323

(22) Filed: Nov. 10, 2022

(51) Int. Cl.
*B25H 3/00* (2006.01)

(52) U.S. Cl.
CPC .................................... *B25H 3/003* (2013.01)

(58) Field of Classification Search
CPC ...................................................... B25H 3/003
See application file for complete search history.

(56) References Cited

U.S. PATENT DOCUMENTS

| | | | | |
|---|---|---|---|---|
| 3,823,526 A * | 7/1974 | Rose | F16B 5/02 | 411/959 |
| 5,931,620 A * | 8/1999 | Sugai | F16B 37/122 | 411/82 |
| 8,047,386 B2 * | 11/2011 | Chen | A47F 7/00 | 211/70.6 |
| 10,675,750 B1 | 6/2020 | Winnard et al. | | |
| 11,059,164 B2 | 7/2021 | Winnard et al. | | |
| 11,376,725 B1 * | 7/2022 | Hsieh | B25H 3/003 | |
| 11,389,945 B1 * | 7/2022 | Kao | B25H 3/04 | |
| 2007/0007156 A1 * | 1/2007 | Wu | B65D 73/0064 | 206/349 |
| 2015/0251310 A1 * | 9/2015 | Ou | B25H 3/04 | 206/372 |
| 2015/0273683 A1 * | 10/2015 | Ou | B25H 3/04 | 206/349 |
| 2018/0313390 A1 * | 11/2018 | Yamaguchi | F16B 37/122 | |
| 2019/0091842 A1 * | 3/2019 | Chou | B25B 13/06 | |
| 2019/0293106 A1 * | 9/2019 | Panhoelzl | G01L 19/14 | |
| 2020/0016736 A1 * | 1/2020 | Kao | B25H 3/003 | |
| 2021/0316443 A1 | 10/2021 | Winnard et al. | | |
| 2023/0080323 A1 * | 3/2023 | Yoshida | F16B 37/045 | 411/85 |

FOREIGN PATENT DOCUMENTS

| | | | |
|---|---|---|---|
| GB | 2167148 A * | 5/1986 | F16B 37/122 |
| GB | 2167148 A | 5/1986 | |
| GB | 2530579 A * | 3/2016 | B25H 3/04 |
| GB | 2576024 A * | 2/2020 | B25H 3/003 |
| GB | 2576024 A | 2/2020 | |
| JP | 2010048308 A * | 3/2010 | |
| JP | 2010048308 A | 3/2010 | |
| TW | I661912 B | 6/2019 | |

* cited by examiner

*Primary Examiner* — Rafael A Ortiz
*Assistant Examiner* — Abigail Elizabeth Guidry
(74) *Attorney, Agent, or Firm* — Best & Flanagan LLP

(57) ABSTRACT

A socket holding frame assembly has a track base and multiple socket positioning holders. The track base has a base panel and a connection hole formed through the base panel. The socket positioning holders are slidably and rotatably connected with the track base. Each socket positioning holder comprises a holder body, an inserted part being metallic and combined in a bottom of the holder body, and a bolt inserted through the connection hole from a bottom of the base panel and connected with the inserted part via a threaded engagement to tightly fasten the holder body on the track base.

18 Claims, 15 Drawing Sheets

SOCKET HOLDING FRAME ASSEMBLY

BACKGROUND OF THE INVENTION

1. Field of the Invention

The present invention relates to a socket holding frame assembly, and more particularly to a socket holding frame assembly having socket positioning holders being adjustable in position and in orientation and prolonging the service life thereof.

2. Description of Related Art

A conventional socket holding frame assembly has a track base and multiple socket positioning holders for mounting sockets. Each socket positioning holder is secured on the track base via a self-tapping screw to prevent the socket positioning holder from rotating or sliding relative to the track base.

The above-mentioned socket positioning holder is made of plastic and has a pilot hole formed at a bottom thereof. While the self-tapping screw is being driven and screwed into the pilot hole, a thread is formed at the periphery of the pilot hole by the self-tapping screw. Therefore, a threaded engagement between the self-tapping screw and the socket positioning holder is achieved. The socket positioning holder is fastened to the track base by tightening the self-tapping screw.

However, the self-tapping screw is frequently released or tightened for adjusting a position or an orientation of the socket positioning holder. The thread formed at the periphery of the pilot hole is easily worn and deformed accordingly. After long-term use and operation of the conventional socket holding frame assembly, a gap defined between the thread formed at the periphery of the pilot hole and the self-tapping screw is enlarged. Whereby, the self-tapping screw is easily stripped and loosened. The socket positioning holder cannot be firmly and stably fastened to the track base.

Moreover, if the self-tapping screw is over torqued, the pilot hole in the socket positioning holder is prone to breakage and damage. Therefore, the socket positioning holder cannot be connected with the self-tapping screw any more.

To overcome the shortcomings, the present invention tends to provide a socket holding frame assembly to mitigate or obviate the aforementioned problems.

SUMMARY OF THE INVENTION

The main objective of the invention is to provide a socket holding frame assembly that has socket positioning holders configured to slide along and rotated relative to a track base and firmly and stably fastened on the track base via a bolt for use conveniently.

The socket holding frame assembly comprises a track base and multiple socket positioning holders. The track base has a base panel being elongated and a connection hole formed through the base panel. The socket positioning holders are arranged along a longitudinal direction of the track base and slidably and rotatably connected to the track base. Each of the multiple socket positioning holders comprises a holder body, an inserted part, and a bolt. The holder is rotatably, slidably, and detachably connected to the track base and is disposed above the base panel. The inserted part is made of metal, is inserted into and combined with a bottom of the holder body, and has a threaded hole communicating with the connection hole of the track base. The bolt is inserted through the connection hole of the track base from a bottom of the base panel and is connected with the threaded hole of the inserted part to tightly fasten the holder body to the track base. The bolt includes a rod inserted through the connection hole of the track base from the bottom of the base panel and connected with the threaded hole of the inserted part via threaded engagement and a head formed at an end of the rod and disposed below the base panel. Wherein, the inserted part of each of the multiple socket positioning holders is combined with the holder body of the socket positioning holder as a whole unit by insert molding. A periphery of the insert part of each of the multiple socket positioning holders is surrounded by the holder body without gaps.

Other objects, advantages and novel features of the invention will become more apparent from the following detailed description when taken in conjunction with the accompanying drawings.

DETAILED DESCRIPTION OF PREFERRED EMBODIMENT

Figure 1:
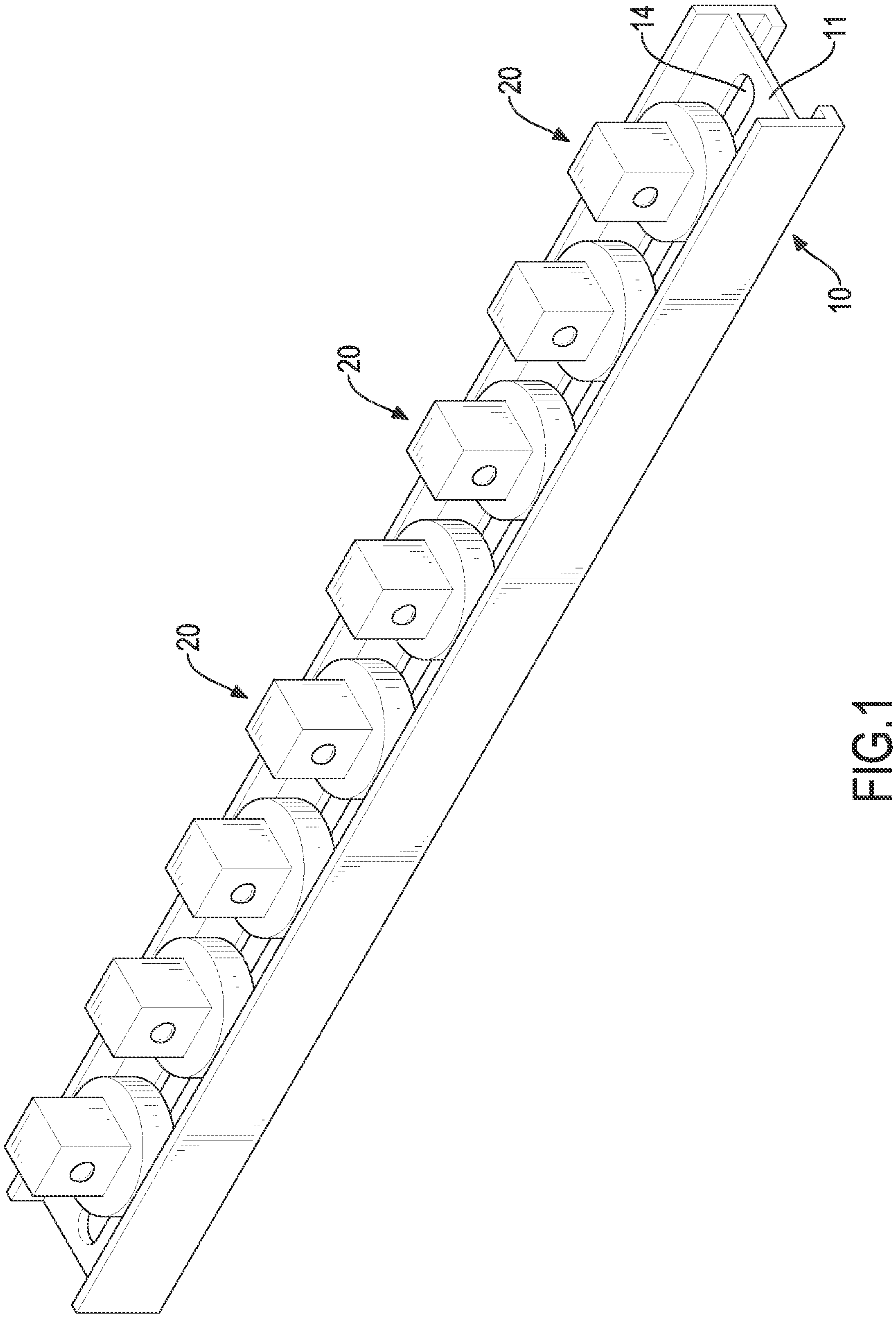
FIG. 1 is a perspective view of a first embodiment of a socket holding frame assembly in accordance with the present invention.
Figure 2:
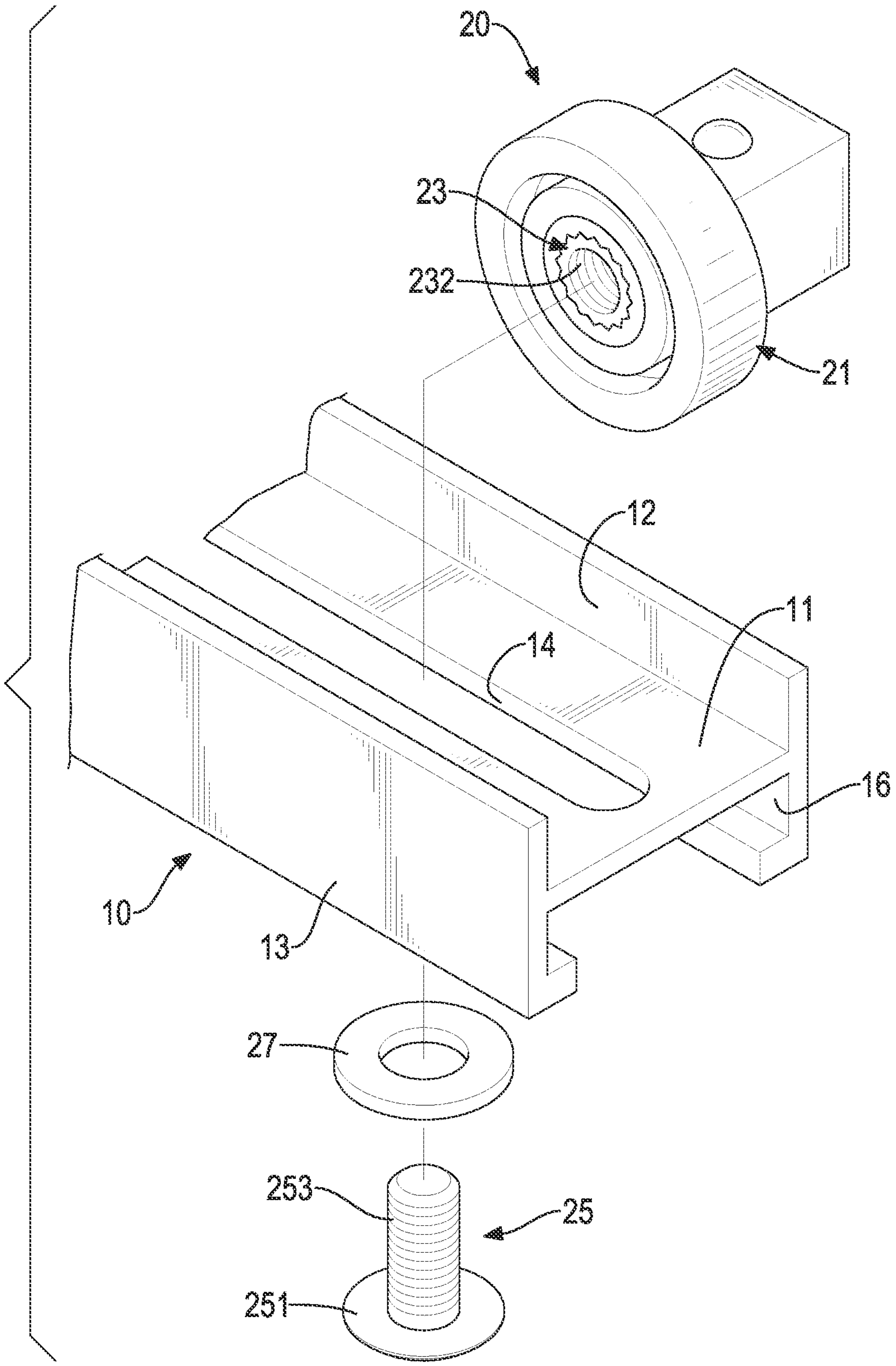
FIG. 2 is an enlarged exploded perspective view of the socket holding frame assembly in FIG. 1.

With reference to FIGS. 1 to 4, a socket holding frame assembly in accordance with the present invention comprises a track base 10 and multiple socket positioning holders 20.

With reference to FIGS. 1 to 4, and 6, the track base 10 is elongated and is made of metal. The track base 10 has an elongated base panel 11 and a connection hole 14. The connection hole 14 is elongated, extends along a longitudinal direction of the base panel 11, and is formed through the base panel 11. Two ends of the connection hole 14 are closed ends and are respectively spaced apart from two ends of the base panel 11. In some embodiments, the connection holes 14 may be replaced by multiple elongated holes arranged in a line along the base panel 11 and spaced apart from one another.

Figure 4:
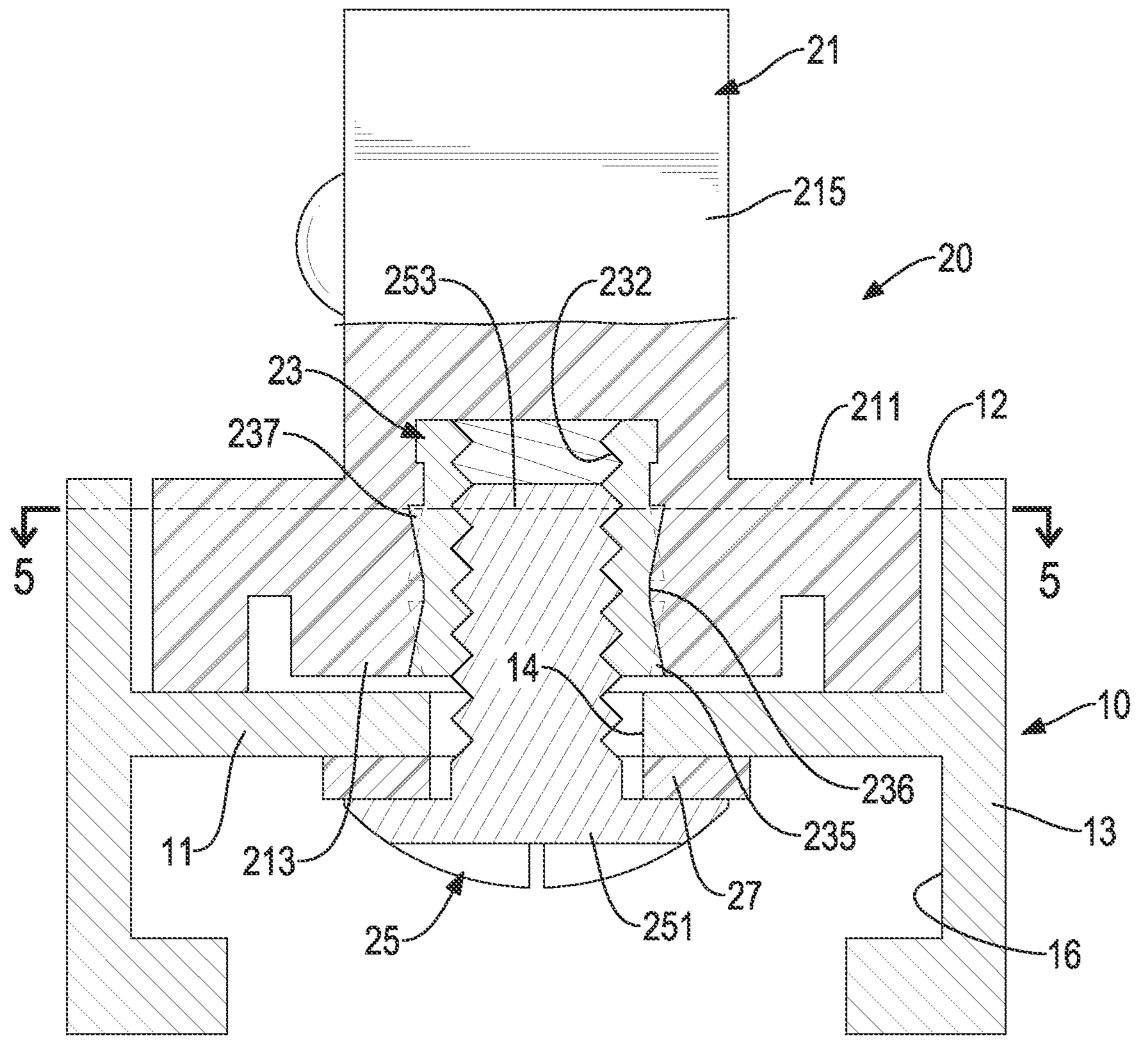
FIG. 4 is an end view in partial section of the socket holding frame assembly in FIG. 1.
Figure 5:
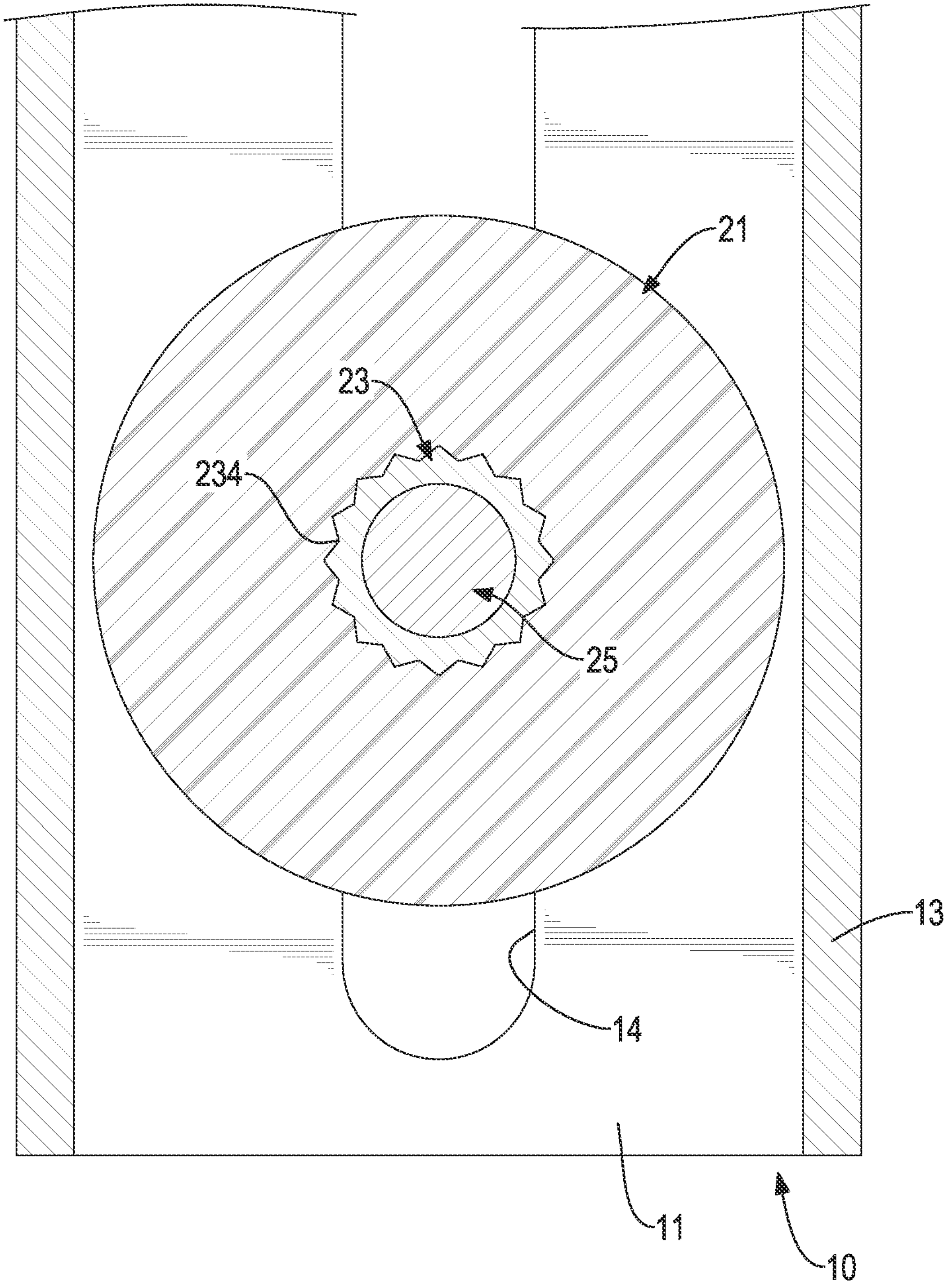
FIG. 5 is a cross sectional top view of the socket holding frame assembly along line 5-5 in FIG. 4.
Figure 6:
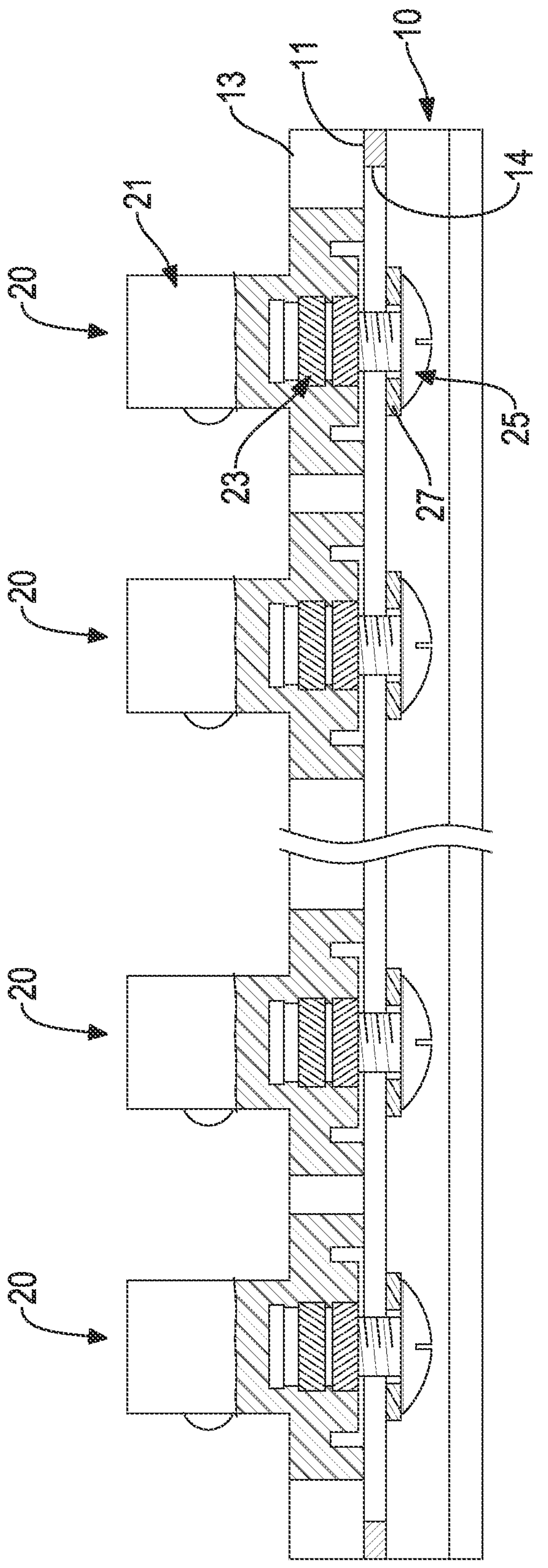
FIG. 6 is a side view in partial section of the socket holding frame assembly in FIG. 1.
Figure 7:
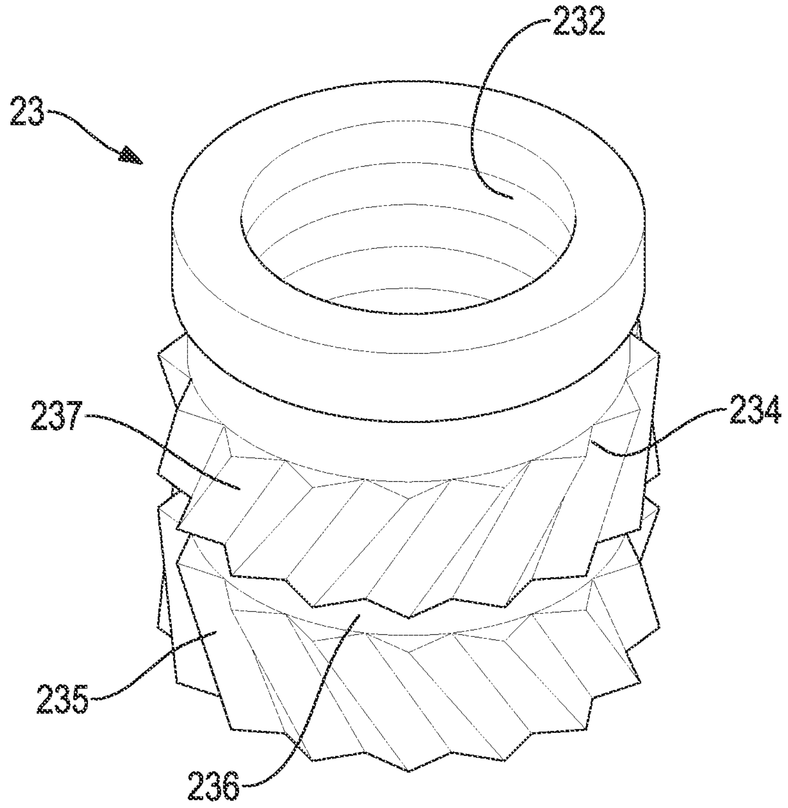
FIG. 7 is a perspective view of an inserted part in FIG. 3.
Figure 8:
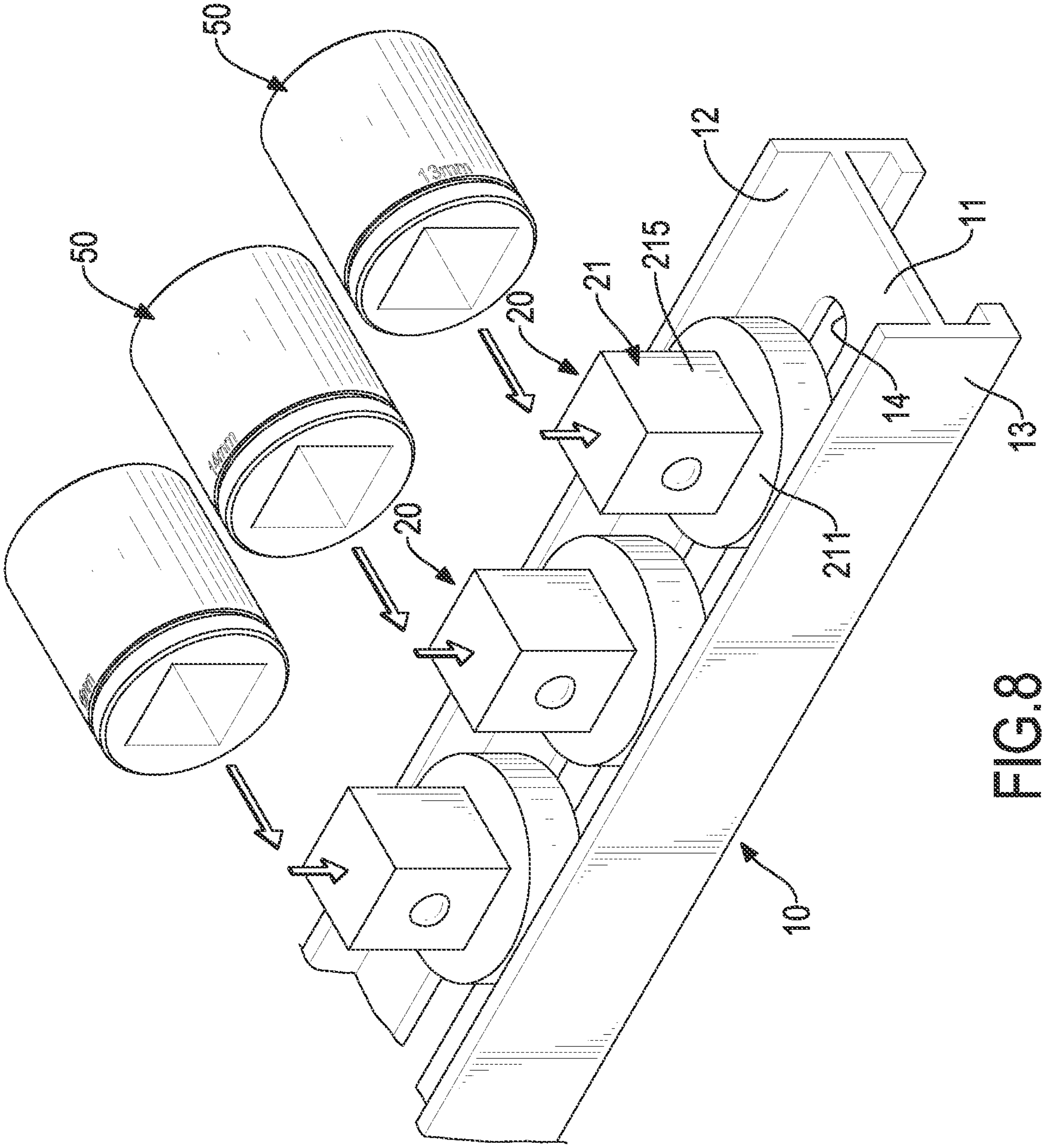
FIG. 8 is an enlarged operational exploded perspective view of the socket holding frame assembly in FIG. 1.
Figure 9:
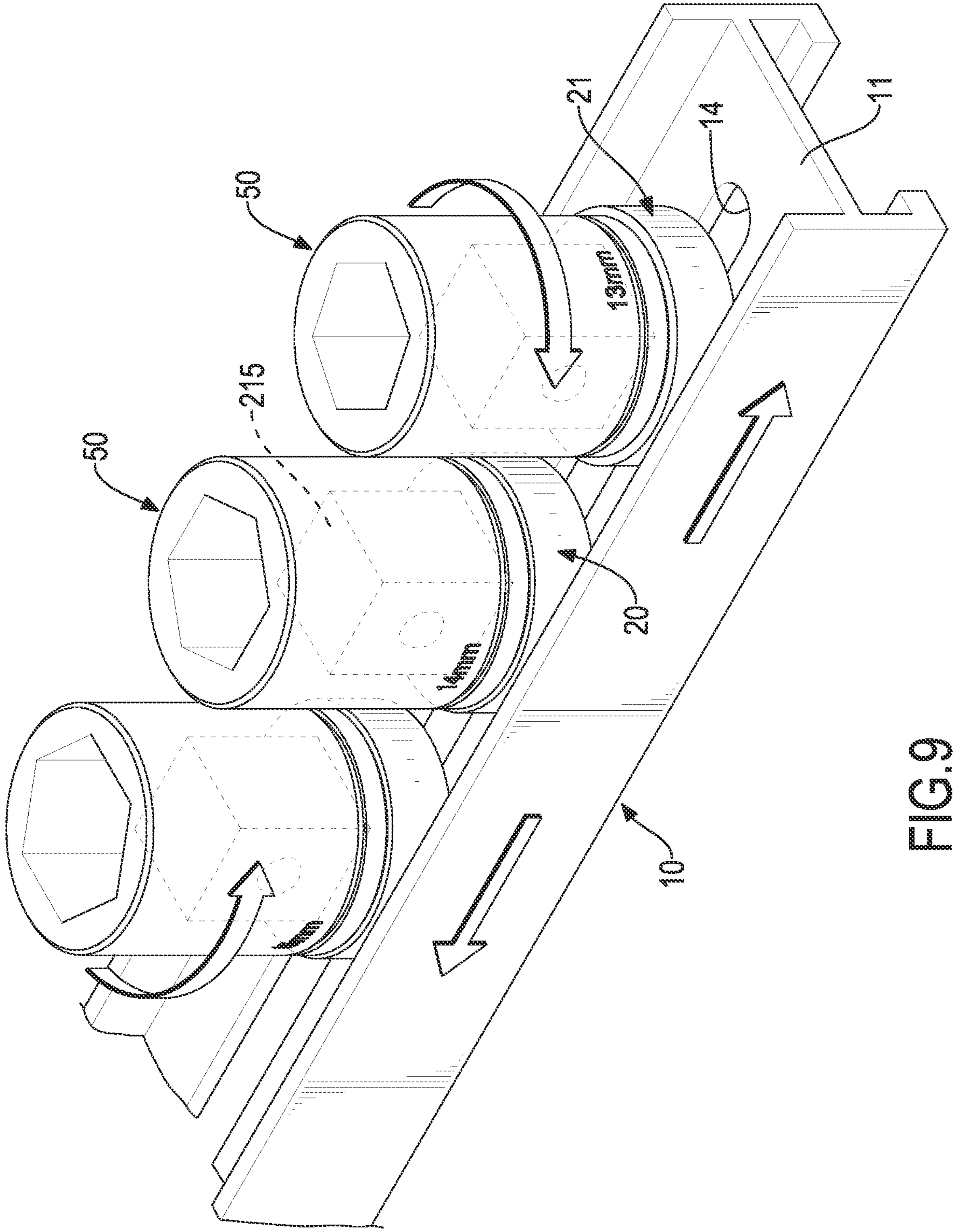
FIG. 9 is an enlarged operational perspective view of the socket holding frame assembly in FIG. 1.
Figure 10:
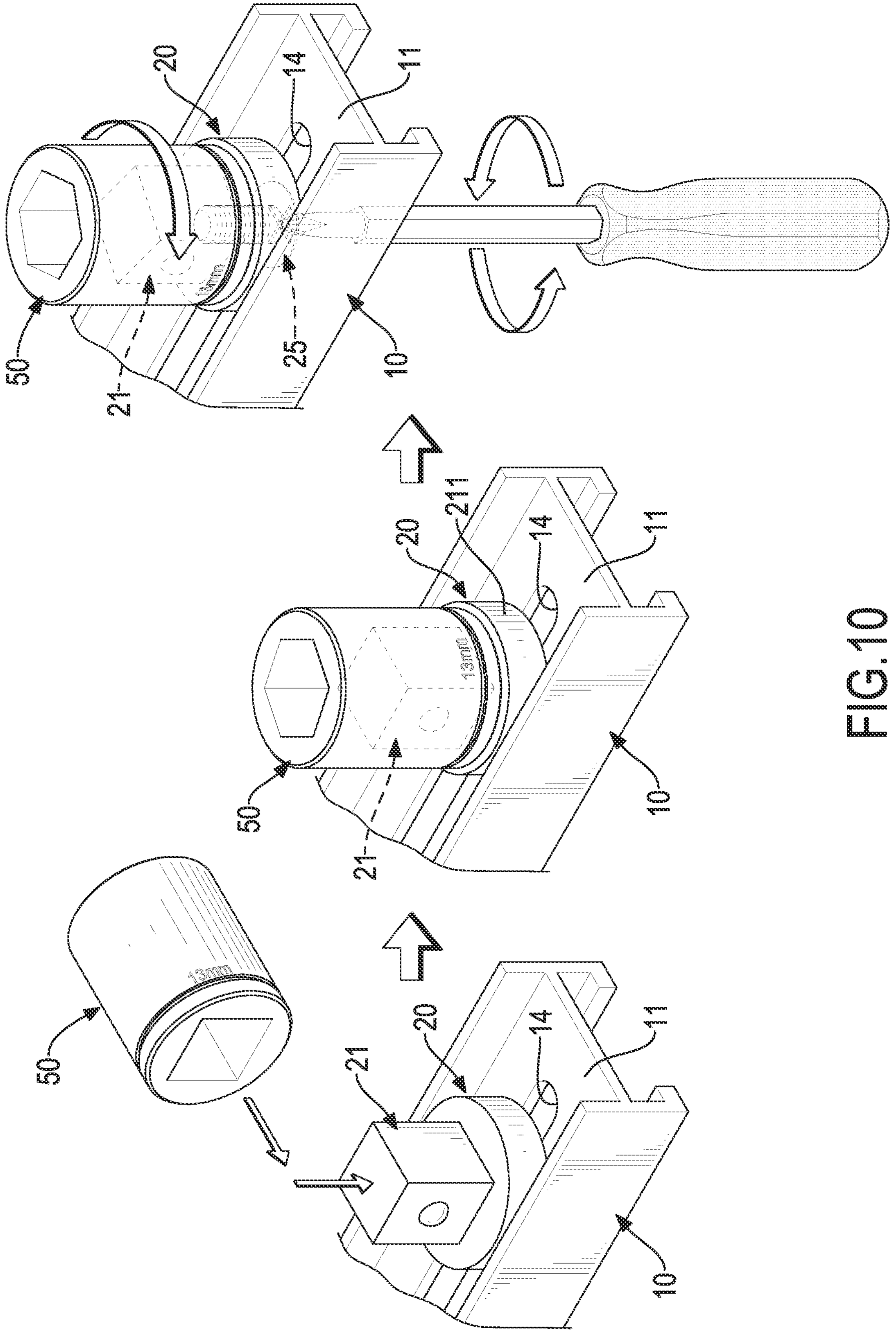
FIG. 10 shows operational perspective views of the socket holding frame assembly in FIG. 1.

The track base 10 may be an elongated track having an H-shaped cross section and comprises two side panels 13 respectively connected with two sides of the base panel 11. The two side panels 13 extend upwardly from the base panel 11 to define an upper channel 12 between a top of the base panel 11 and the two side panels 13. The two side panels 13 extend downwardly from the base panel 11 to define a lower channel 16 between a bottom of the base panel 11 and the two side panels 13. The lower channel 16 communicates with the upper channel 12 via the connection hole 14. With reference to FIG. 4, two tabs may be respectively formed at bottoms of the two side panels 13 and extend toward each other. A bottom opening is formed at a bottom of the track base 10, is disposed between the two tabs, and communicates with the lower channel 16 accordingly.

With reference to FIGS. 2, 3, 6, and 8, the multiple socket positioning holders 20 are arranged along the longitudinal direction of the track base 10 and are slidably and rotatably connected to the track base 10. Each of the socket positioning holders 20 comprises a holder body 21, an inserted part 23, and a bolt 25. The holder body 21 is made of a plastic material, is rotatably, slidably, and detachably connected to the track base 10, and is disposed above the base panel 11. The holder body 21 includes a holder base 211 and a holding portion 215. The holder base 211 may have a circular rim, and is slidably and rotatably disposed in the upper channel 12 of the track base 10. The holding portion 215 is formed on and protrudes from a top surface of the holder base and is adapted to engage and connect with a socket 50. Accordingly, sockets 50 can be set on the track base 10 via the socket positioning holders 20.

With reference to FIGS. 2 to 6, the inserted part 23 is made of metal, is inserted into and combined with a bottom of the holder body 21, and has a threaded hole 232 corresponding to the connection hole 14 of the track base 10 in position and communicating with the connection hole 14 of the track base 10. The bolt 25 is inserted through the connection hole 14 from the lower channel 16 and the bottom of the base panel 11, and is connected with the threaded hole 232 of the inserted part 23 via threaded engagement to tightly fasten the holder body 21 to the track base 10.

The holder body 21 includes an insertion portion 213 formed at a bottom of the holder body 21. The inserted part 23 is inserted into and combined with the insertion portion 213 of the holder body 21. A bottom surface of the insertion portion 213 and a bottom surface of the inserted part 23 are located higher than a bottom surface of the holder base 211. When the bottom surface of the holder base 211 contacts the top of the base panel 11, a gap is formed between the top of the base panel 11 and the bottom surface of the insertion portion 213, hereby preventing the bottom surface of the inserted part 23 from directly contacting the top of the base panel 11. The inserted part 23 may be combined with the holder body 21 as a whole unit by insert molding. A periphery of the insert part of the inserted part 23 is surrounded by the holder body 21 without gaps. The inserted part 23 may be inserted into and combined with the insertion portion 213 of the holder body 21 by ultrasonic insertion or heat staking.

Figure 3:
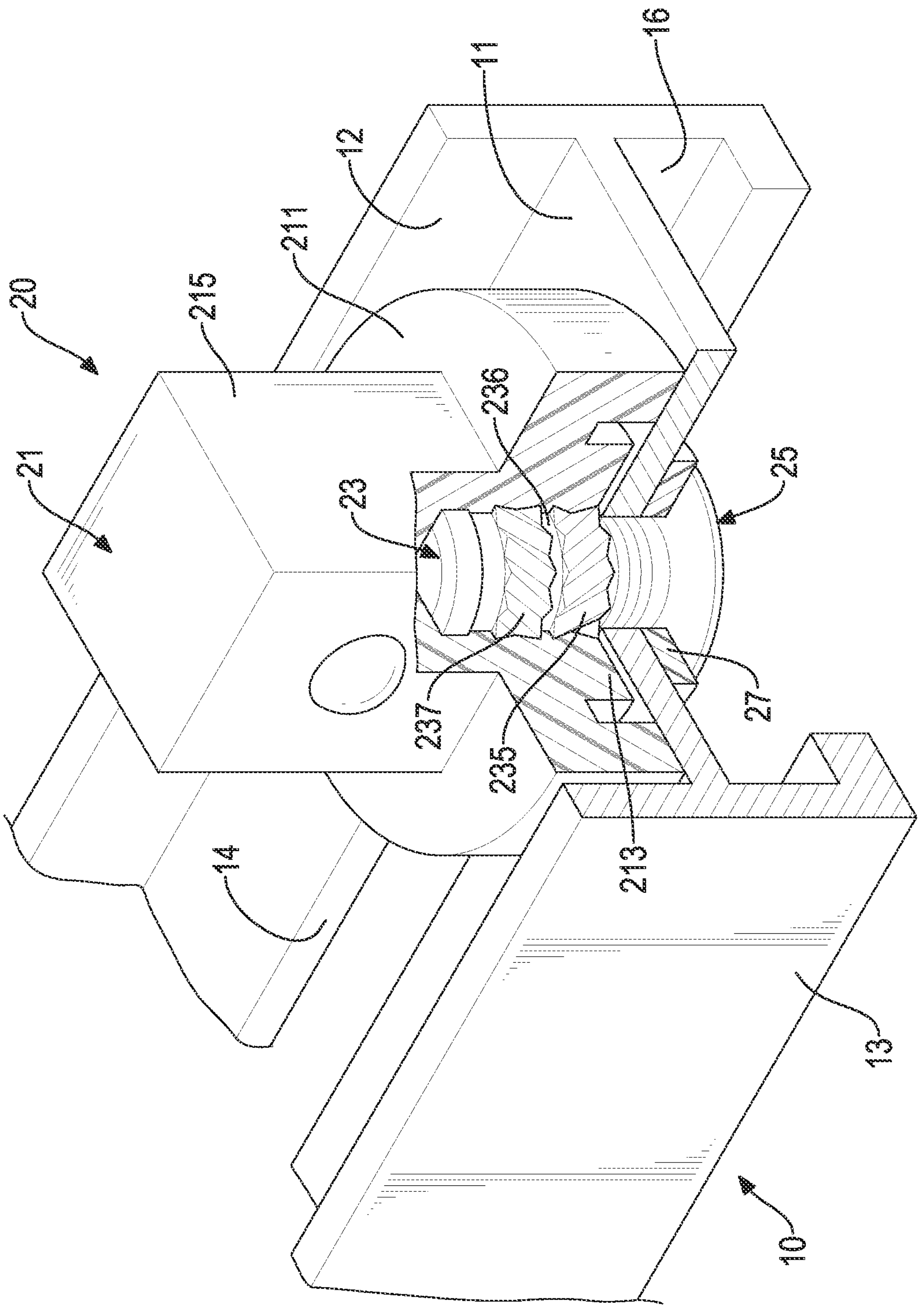
FIG. 3 is an enlarged perspective view in partial section of the socket holding frame assembly in FIG. 1.
Figure 11:
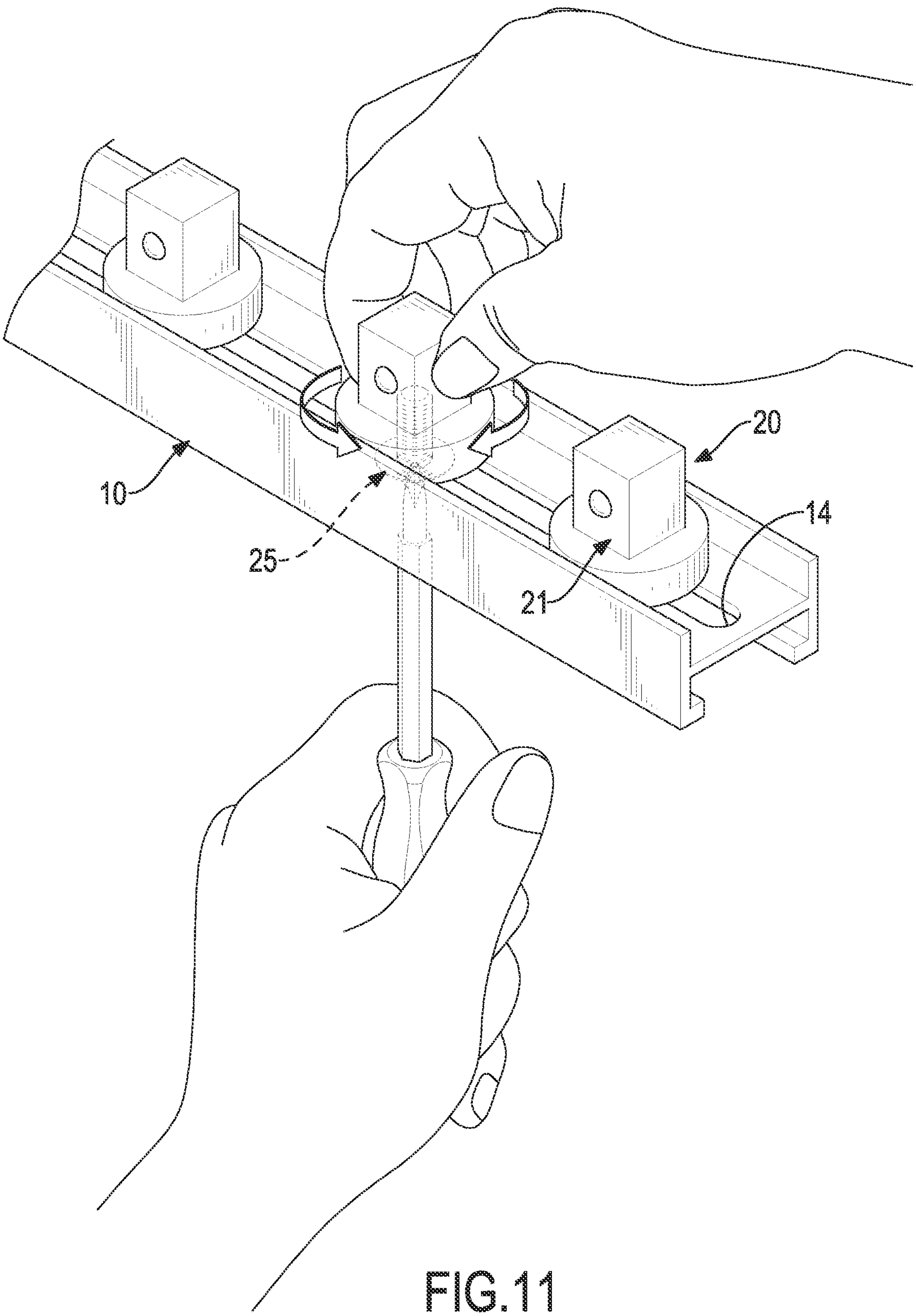
FIG. 11 an enlarged operational perspective view of the socket holding frame assembly in FIG. 1.

With reference to FIGS. 3 and 11, after the bolt 25 is connected with the threaded hole 232 of the inserted part 23 combined in the bottom of the holder body 21, the user can hold the holder body 21 to rotate the holder body 21 with the inserted part 23 relative to the bolt 25 for releasing or fastening the socket positioning holder 20.

Each socket positioning holder 20 comprises the inserted part 23 made of metal and combined in the bottom of the holder body 21, and the bolt 25 is connected with the threaded hole 232 of the inserted part 23 via the threaded engagement. Therefore, even the bolt 25 is released and fastened repeatedly, a thread of the threaded hole 232 of the inserted part 23 will hardly be worn and cannot deform easily. Accordingly, the service life of each socket positioning holder 20 is prolonged, and the socket positioning holder 20 can be securely fastened to the track base 10. After long-term use, the socket positioning holder 20 can be still stably and firmly fastened to the track base 10. Even the bolt 25 is over torqued, the inserted part 23 will not easily break.

Figure 12:
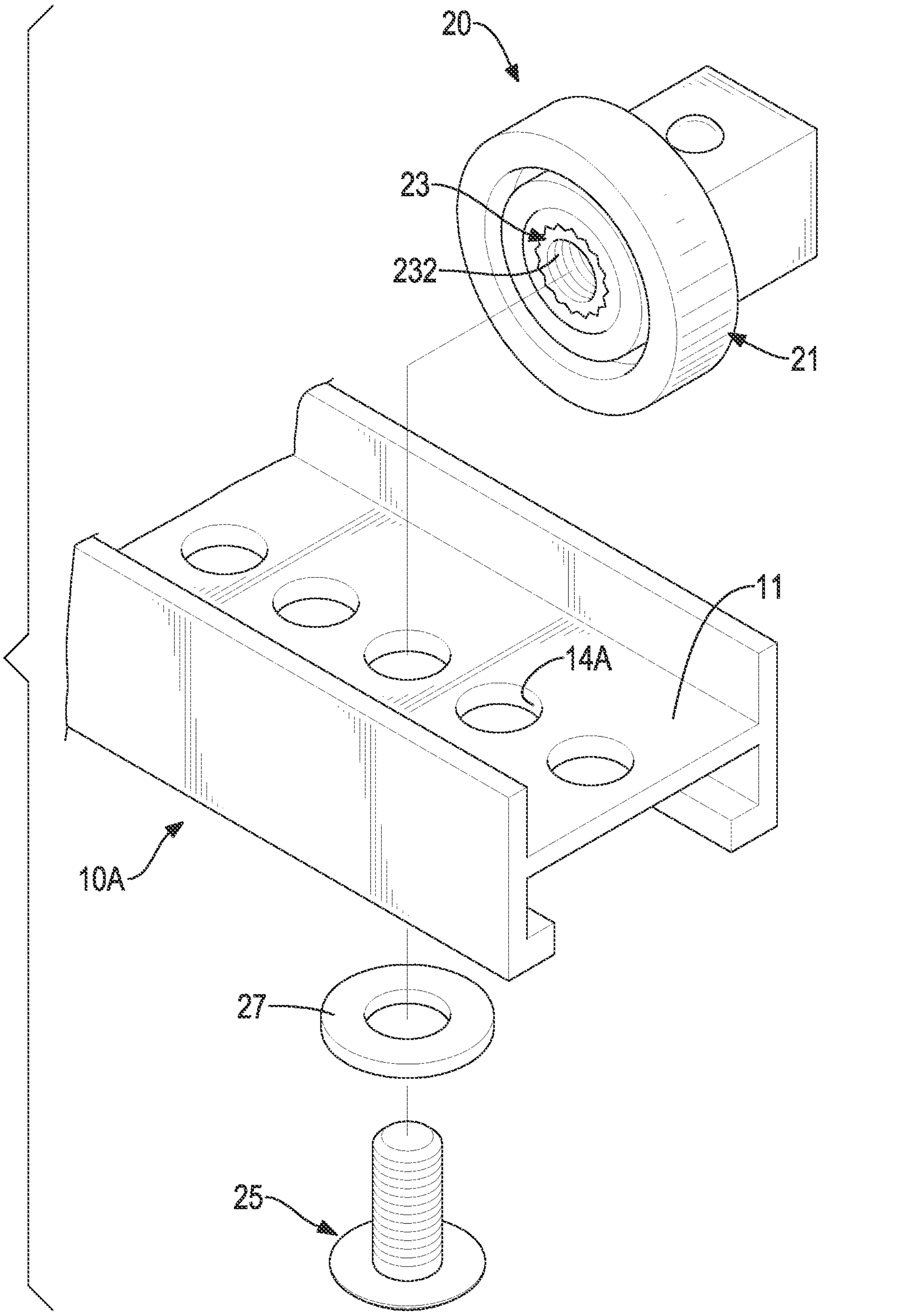
FIG. 12 is an exploded perspective view of a second embodiment of a socket holding frame assembly in accordance with the present invention.
Figure 13:
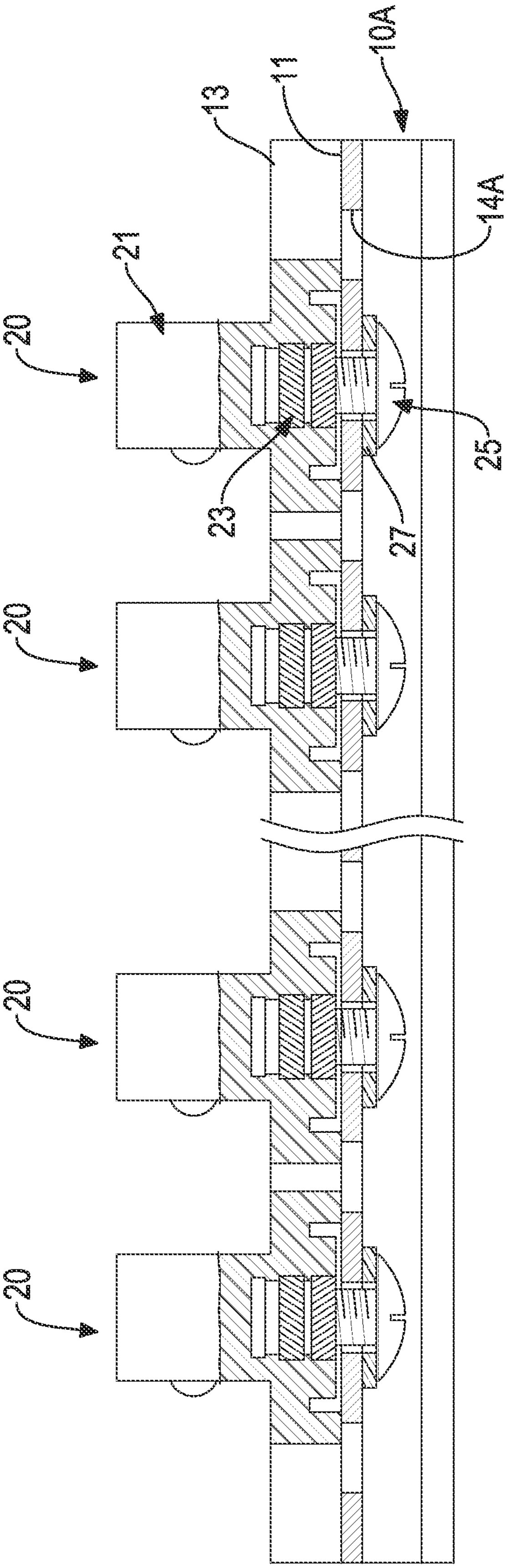
FIG. 13 is a side view in partial section of the socket holding frame assembly in FIG. 12.

With reference to FIGS. 12 and 13, in a second embodiment, the track base 10A includes multiple connection holes 14A arranged in a line along the track base 10A. Each connection hole 14A is a circular through hole formed through the base panel 11. Accordingly, when the holder body 21 is moved to align the threaded hole 232 of the inserted part 23 with one of the connection holes 14A, the bolt 25 can be inserted through the connection hole 14A and screwed into the threaded hole 232 of the inserted part 23 to fix the holder body 21 in position. When the bolt 25 is detached from the holder body 21 of the socket positioning holder 20, the position and the orientation of the holder body 21 can also be adjusted.

Figure 14:
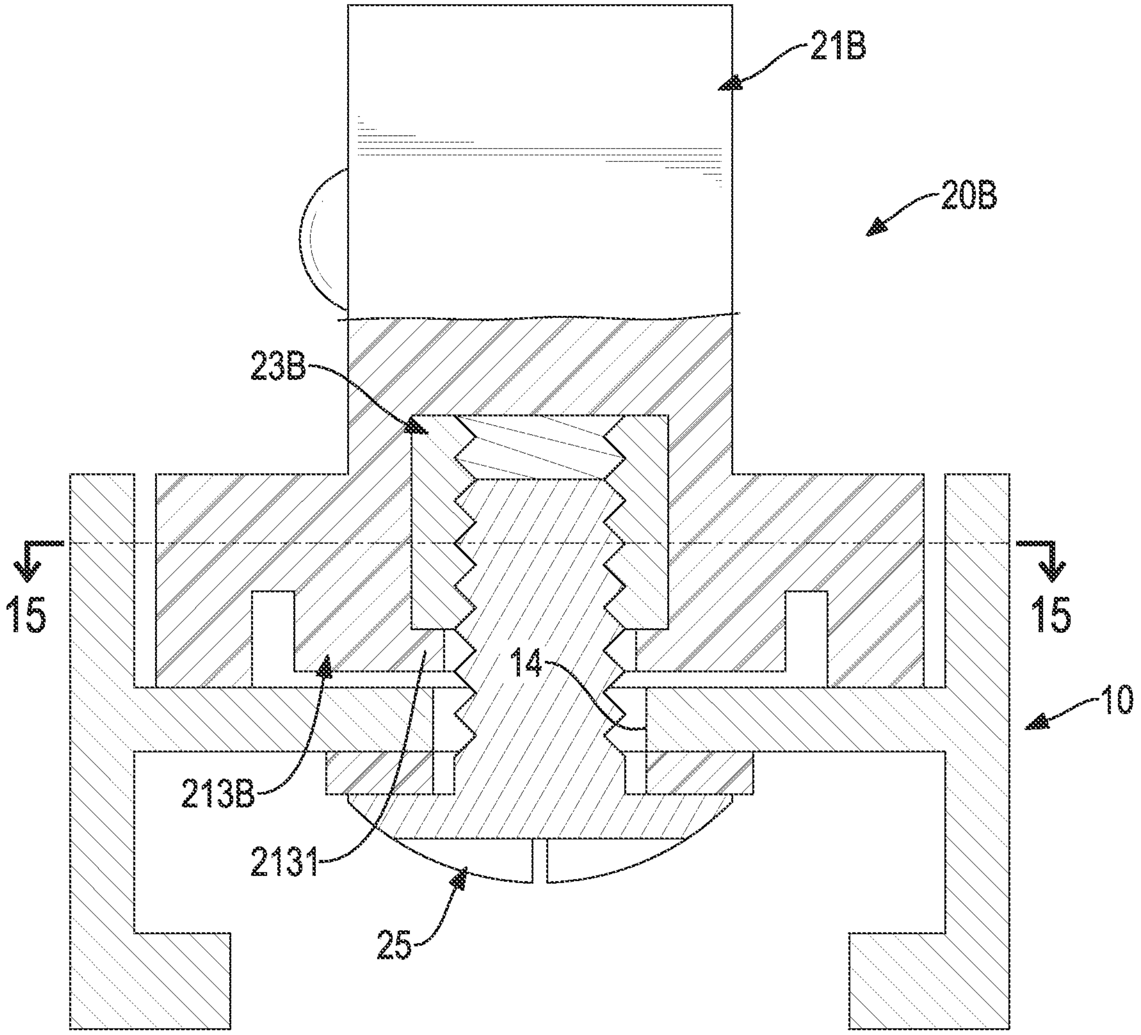
FIG. 14 is an end view in partial section of a third embodiment of a socket holding frame assembly in accordance with the present invention.
Figure 15:
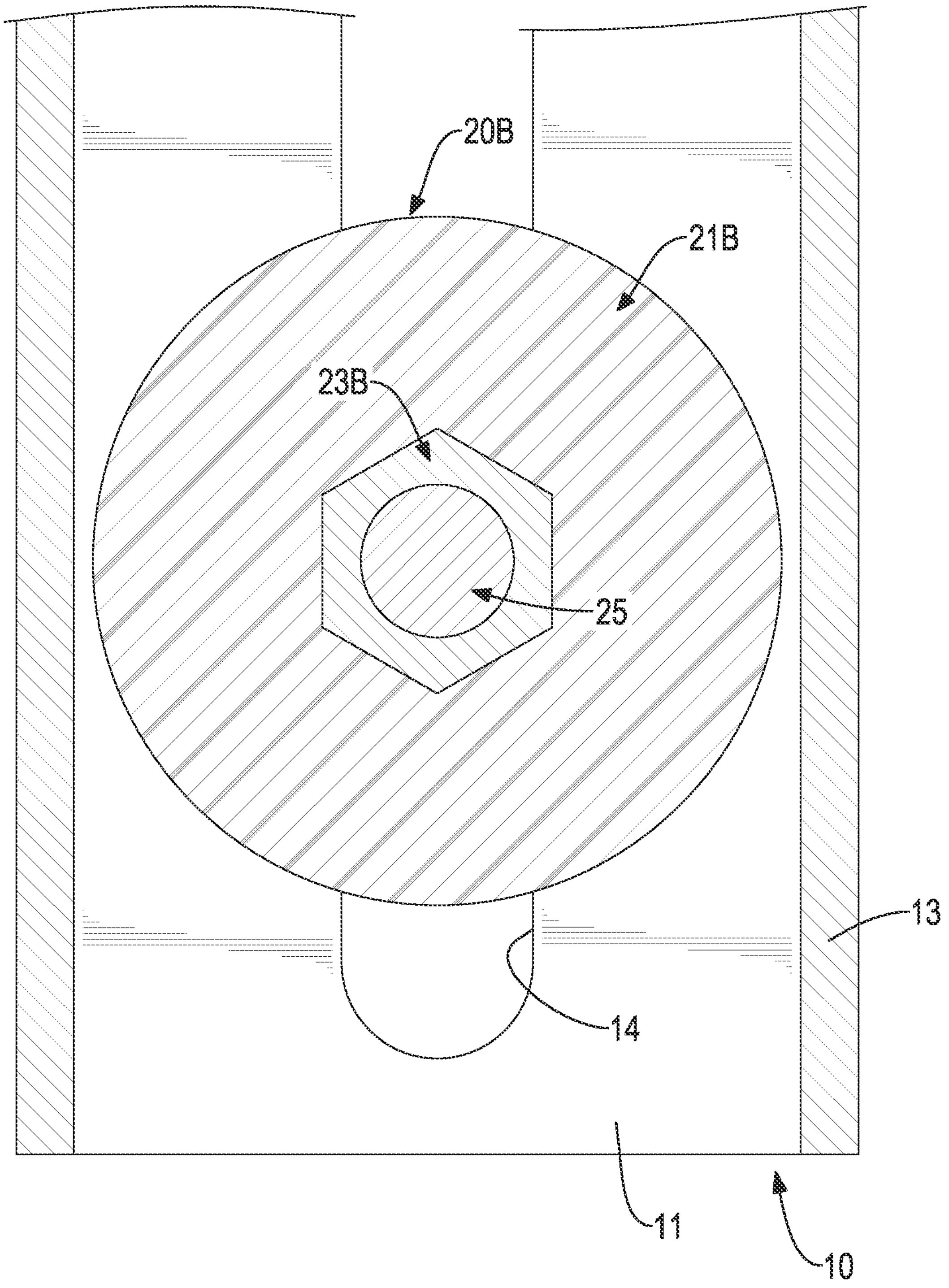
FIG. 15 is a cross sectional top view of the socket holding frame assembly along line 15-15 in FIG. 14.

With reference to FIGS. 14 and 15, in a third embodiment, the inserted part 23B of each socket positioning holder 20B has a polygonal rim. The inserted part 23B is inserted in and surrounded by the insertion portion 213B of the holder body 21B. The insertion portion 213B includes an insertion bottom flange 2131 located below and covering the bottom surface of the inserted part 23B.

With such arrangements, each socket positioning holder 20 can be rotated relative to the track base 10 to adjust the orientation thereof and can be slid relative to the track base 10 to adjust the position thereof. The socket positioning holder 20 can be firmly and stably fastened to the track base 10 to fix the position and the orientation thereof via the threaded engagement between the bolt 25 and the inserted part 23 combined in the bottom of the holder body 21. As the inserted part 23 is made of metal, the thread formed in the threaded hole 232 of the inserted part 23 will hardly be worn and cannot deform easily, the space between the threaded hole 232 and the bolt 25 can be maintained, and the bolt 25 and the threaded hole 232 of the inserted part 23 can be kept in a tight connection. Even the bolt 25 is over torqued, the inserted part 23 is not prone to breakage and damage. After the long-term use, the socket positioning holder 20 can still be firmly and stably fastened on the track base 10.

What is claimed is:

1. A socket holding frame assembly comprising:
a track base having
a base panel being elongated; and
a connection hole formed through the base panel; and
multiple socket positioning holders arranged along a longitudinal direction of the track base and slidably and rotatably connected to the track base, each of the multiple socket positioning holders comprising a holder body rotatably, slidably, and detachably connected to the track base and disposed above the base panel;

an inserted part, made of metal, inserted into and combined with a bottom of the holder body, and having a threaded hole communicating with the connection hole of the track base; and a bolt inserted through the connection hole of the track base from a bottom of the base panel, connected with the threaded hole of the inserted part to tightly fasten the holder body to the track base, and including a rod inserted through the connection hole of the track base from the bottom of the base panel and connected with the threaded hole of the inserted part via threaded engagement; and a head formed at an end of the rod and disposed below the base panel; wherein the inserted part of each of the multiple socket positioning holders is combined with the holder body of the socket positioning holder as a whole unit by insert molding;

a periphery of the insert part of each of the multiple socket positioning holders is surrounded by the holder body without gaps.

2. The socket holding frame assembly as claimed in claim 1, wherein the holder body of each of the multiple socket positioning holders includes a holder base and an insertion portion formed at the bottom of the holder body;

the inserted part of each of the multiple socket positioning holders is inserted into and combined with the insertion portion of the holder body of the socket positioning holder; and a bottom surface of the inserted part of each of the multiple socket positioning holders is located higher than a bottom surface of the holder base of the holder body of the socket positioning holder.

3. The socket holding frame assembly as claimed in claim 1, wherein the inserted part of each of the multiple socket positioning holders includes a plurality of engaging recesses arranged around an external periphery of the inserted part and engaging with the holder body of the socket positioning holder.

4. The socket holding frame assembly as claimed in claim 1, wherein the inserted part of each of the multiple socket positioning holders includes a first toothed portion;

a second toothed portion located above the first toothed portion; and an annular groove formed between the first toothed portion and the second toothed portion and engaging with the holder body of the socket positioning holder;

a plurality of engaging recesses arranged around the first toothed portion and engaging with the holder body of the socket positioning holder; and a plurality of engaging recesses arranged around the second toothed portion and engaging with the holder body of the socket positioning holder.

5. The socket holding frame assembly as claimed in claim 4, wherein the plurality of the engaging recesses arranged around the first toothed portion and the plurality of the engaging recesses arranged around the second toothed portion are respectively tilted clockwise and counterclockwise.

6. The socket holding frame assembly as claimed in claim 1, wherein the inserted part of each of the multiple socket positioning holders has a polygonal rim.

7. The socket holding frame assembly as claimed in claim 1, wherein each of the multiple socket positioning holders comprises a washer disposed between the head of the bolt of the socket positioning holder and the base panel of the track base.

8. The socket holding frame assembly as claimed in claim 2, wherein each of the multiple socket positioning holders comprises a washer disposed between the head of the bolt of the socket positioning holder and the base panel of the track base.

9. The socket holding frame assembly as claimed in claim 3, wherein each of the multiple socket positioning holders comprises a washer disposed between the head of the bolt of the socket positioning holder and the base panel of the track base.

10. The socket holding frame assembly as claimed in claim 4, wherein each of the multiple socket positioning holders comprises a washer disposed between the head of the bolt of the socket positioning holder and the base panel of the track base.

11. The socket holding frame assembly as claimed in claim 5, wherein each of the multiple socket positioning holders comprises a washer disposed between the head of the bolt of the socket positioning holder and the base panel of the track base.

12. The socket holding frame assembly as claimed in claim 6, wherein each of the multiple socket positioning holders comprises a washer disposed between the head of the bolt of the socket positioning holder and the base panel of the track base.

13. The socket holding frame assembly as claimed in claim 7, wherein the connection hole of the track base is elongated, extends along the longitudinal direction of the base panel, and has two closed ends.

14. The socket holding frame assembly as claimed in claim 8, wherein the connection hole of the track base is elongated, extends along the longitudinal direction of the base panel, and has two closed ends.

15. The socket holding frame assembly as claimed in claim 9, wherein the connection hole of the track base is elongated, extends along the longitudinal direction of the base panel, and has two closed ends.

16. The socket holding frame assembly as claimed in claim 10, wherein the connection hole of the track base is elongated, extends along the longitudinal direction of the base panel, and has two closed ends.

17. The socket holding frame assembly as claimed in claim 11, wherein the connection hole of the track base is elongated, extends along the longitudinal direction of the base panel, and has two closed ends.

18. The socket holding frame assembly as claimed in claim 12, wherein the connection hole of the track base is elongated, extends along the longitudinal direction of the base panel, and has two closed ends.

* * * * *